United States Patent
Rieke et al.

(10) Patent No.: US 12,492,676 B2
(45) Date of Patent: Dec. 9, 2025

(54) WIND TURBINE AND METHOD FOR CONTROLLING THE SAME

(71) Applicants: Nordex Energy SE & Co. KG, Hamburg (DE); Nordex Energy Spain S.A.U., Barásoain (ES)

(72) Inventors: Johannes Rieke, Hamburg (DE); Antonio Torrese Elizondo, Pamplona (ES); Jacob Laborenz, Hannover (DE); Jan Gellermann, Hamburg (DE); Edwin van Solingen, Norderstedt (DE); Edurne Miranda Suescun, Mutilva (SE); Alberto Garcia Barace, Pamplona (ES); Joerg Schwarte, Rostock (DE); Jan-Erik Manitz, Hamburg (DE); Fabian Buessis, Hamburg (DE); Gritt Prokriefke, Rostock (DE)

(73) Assignees: Nordex Energy SE & Co. KG, Hamburg (DE); Nordex Energy Spain S.A.U., Barásoain (ES)

( * ) Notice: Subject to any disclaimer, the term of this patent is extended or adjusted under 35 U.S.C. 154(b) by 0 days.

(21) Appl. No.: 18/059,795

(22) Filed: Nov. 29, 2022

(65) Prior Publication Data
US 2023/0184214 A1    Jun. 15, 2023

(30) Foreign Application Priority Data
Dec. 15, 2021   (EP) ..................... 21214882

(51) Int. Cl.
*F03D 7/02*    (2006.01)
*F03D 13/20*   (2016.01)
(Continued)

(52) U.S. Cl.
CPC ......... *F03D 7/0204* (2013.01); *F03D 7/0276* (2013.01); *F03D 13/20* (2016.05);
(Continued)

(58) Field of Classification Search
CPC .... F03D 7/0204; F03D 7/0212; F03D 7/0296; F03D 7/042–044; F03D 7/0298;
(Continued)

(56) References Cited

U.S. PATENT DOCUMENTS

| | | | | |
|---|---|---|---|---|
| 4,515,525 A * | 5/1985 | Doman | ................. | F03D 7/0204 416/41 |
| 8,362,632 B2 * | 1/2013 | Nielsen | ................. | F03D 7/0204 290/55 |
| 8,550,769 B2 * | 10/2013 | Behnke | ................. | F03D 80/00 415/908 |
| 2011/0049884 A1 | 3/2011 | Rosenvard et al. | | |

(Continued)

FOREIGN PATENT DOCUMENTS

| | | | |
|---|---|---|---|
| CN | 106762412 A | * | 5/2017 |
| EP | 0868608 B1 | * | 3/2002 |

(Continued)

*Primary Examiner* — Nathaniel E Wiehe
*Assistant Examiner* — Art Golik
(74) *Attorney, Agent, or Firm* — Walter Ottesen, P.A.

(57) ABSTRACT

A method is for controlling a wind turbine. The wind turbine has a tower, a nacelle, a rotor with at least two rotor blades and a yaw system with at least one yaw drive configured to rotate the nacelle about a vertical axis of the tower (yaw axis). A control signal for the at least one yaw drive depends on at least one signal indicative of the wind direction. The control signal for the at least one yaw drive further depends on at least one value indicative of a vibration mode of the rotor blades.

10 Claims, 4 Drawing Sheets

(51) Int. Cl.
*F03D 7/04* (2006.01)
*F03D 17/00* (2016.01)

(52) U.S. Cl.
CPC .......... *F03D 7/0212* (2013.01); *F03D 7/0296* (2013.01); *F03D 7/0298* (2023.08); *F03D 7/042* (2013.01); *F03D 17/015* (2023.08); *F03D 17/017* (2023.08); *F03D 17/022* (2023.08); *F03D 17/029* (2023.08); *F05B 2260/96* (2013.01); *F05B 2260/964* (2013.01); *F05B 2270/321* (2013.01); *F05B 2270/329* (2013.01); *F05B 2270/333* (2013.01); *F05B 2270/334* (2013.01); *F05B 2270/821* (2013.01)

(58) Field of Classification Search
CPC .... F03D 17/015; F03D 17/017; F03D 17/029; F03D 17/022; F05B 2260/96; F05B 2270/321; F05B 2270/333; F05B 2270/334; F05B 2260/964; F05B 2270/329; F05B 2270/821
See application file for complete search history.

(56) References Cited

U.S. PATENT DOCUMENTS

| | | | | |
|---|---|---|---|---|
| 2011/0311359 | A1* | 12/2011 | Bjork | F03D 7/0204 416/43 |
| 2011/0318178 | A1* | 12/2011 | Andersen | F03D 7/0204 416/9 |
| 2014/0167415 | A1* | 6/2014 | Mykhaylyshyn | F03D 7/042 290/44 |

FOREIGN PATENT DOCUMENTS

| | | | | |
|---|---|---|---|---|
| EP | 2 290 230 A2 | 3/2011 | | |
| EP | 2951433 B1 * | 12/2018 | ........... | F03D 7/0204 |
| EP | 3 526 469 A1 | 8/2019 | | |
| WO | 97/22804 A1 | 6/1997 | | |
| WO | 2009/068036 A2 | 6/2009 | | |
| WO | WO-2010109262 A2 * | 9/2010 | ............ | F03D 7/047 |
| WO | 2013/182201 A1 | 12/2013 | | |
| WO | 2019/086092 A1 | 5/2019 | | |
| WO | 2019/219138 A1 | 11/2019 | | |
| WO | WO-2020239178 A1 * | 12/2020 | ........... | F03D 7/0224 |

\* cited by examiner

WIND TURBINE AND METHOD FOR CONTROLLING THE SAME

CROSS-REFERENCE TO RELATED APPLICATIONS

This application claims priority of European patent application no. 21 214 882.9, filed Dec. 15, 2021, the entire content of which is incorporated herein by reference.

TECHNICAL FIELD

The present disclosure relates to a method for controlling a wind turbine having a tower, a nacelle and a rotor with at least two rotor blades, and having a yaw system that is configured to rotate the nacelle about a vertical axis of the tower.

BACKGROUND

A yaw system for wind turbines including numerous yaw drives in order to rotate the nacelle relative to the tower was disclosed in US 2011/0049884. The drives include individual control devices that are configured to control the particular motor and to be connected to at least one other control device in order to transmit operating information thereto. In this manner, the controlling of the motors with each other is coordinated, and a desired rotation of the nacelle is thereby established.

A yaw apparatus having at least two actuators was disclosed in EP 3 526 469 B1, wherein the actuators are connected with each other so as to communicate, and each has a control for the decentralized adaptation of the provided torque depending on load signals. In this context, other actuators correct the given torque with auxiliary torque when there is an excessive load on an actuator in order to relieve the overloaded actuator.

A method for controlling a wind turbine was disclosed in WO 2019/219138 A1. In this context, a measuring signal indicative of rotor blade vibrations is obtained from at least one rotor blade. The measuring signal or a derivation therefrom is transformed into a rotating reference system for a given frequency, wherein the rotating reference system can correspond with the rotational frequency of the rotor. In the transformation, a distinction is also made between vibrations in the rotor blade that run forwards and backwards with reference to the rotational direction of the rotor hub. By using the transformed signals, a decision is then made as to whether a so-called whirl mode or whirling mode exists for the vibrations of the rotor blades.

A method is known from WO 2019/086092 A1 for avoiding rotor blade vibrations (edgewise vibrations) in a known manner. The method includes the step of determining a whirling mode frequency of the rotor blade of a wind turbine. Furthermore, a range for a whirling mode frequency is defined that depends on the rotational speed of the rotor. To avoid resonant vibrations of the rotor blade, the rotational speed range of the wind turbine is adapted.

With regard to the rotor blade rotating in a rotor plane, a distinction must be made between a series of natural frequencies as well as the associated vibration modes. With regard to the whirling mode of the rotor blades, a general distinction can be made between flapwise vibrations and edgewise vibrations. With flapwise vibrations, a movement of the rotor blades outside of the rotor plane occurs. With edgewise vibration, the vibration occurs in the rotor plane, wherein a distinction is made between an edgewise forward whirling mode and an edgewise backward whirling mode. In this case, the rotor blade vibrates with the rotational direction of the rotor in edgewise forward whirling mode, whereas it vibrates opposite the rotational direction of the rotor in edgewise backward whirling mode. These vibration modes of the rotor blades are excited by the rotation of the rotor that leads to a periodic vibrational excitation, for example as the rotor blade passes the tower; however, other factors also excite these vibration modes. One major source of excitation is the blade passing frequency, which is triple the rotational speed at which the rotor rotates. If the situation occurs in which the rotor rotates at a rotational speed and the triple of the rotational speed lies close to the natural frequency of a component of the wind turbine, resonant vibrations can occur at the component of the wind turbine which strongly influence the state and the life time of the rotor blades, of the tower and other components of the wind turbine.

SUMMARY

It is an object of the disclosure to provide a method for controlling a wind turbine, as well as such a wind turbine that prevents resonant vibrations in the rotor blades without significantly restricting the power output of the wind turbine.

The method according to the disclosure serves to control a wind turbine having a tower, a nacelle and a rotor with at least two rotor blades, and having a yaw system with at least one yaw drive which rotates the nacelle about a vertical axis of the tower. The yaw system can be implemented in order to align the nacelle with the direction of the wind. The yaw system with the at least one yaw drive is configured to rotate the nacelle about a vertical axis of the tower (yaw axis) wherein a control signal for the at least one yaw drive depends on at least one signal indicative of the wind direction. Furthermore, the control signal for the at least one yaw drive further depends on at least one value indicative of a vibration mode of the rotor blades. By controlling the yaw drive additionally depending on the at least one value indicative of a vibration mode of the rotor blades unwanted vibration modes of the rotor blades are avoided. According to the disclosure, an amplitude of a change in the rotational position of the nacelle at a predetermined frequency (f) is dampened by controlling the at least one yaw drive thus obtaining the rotor blade vibrations to be reduced. Preferable further influencing factors, such as tower mass and tower stiffness and yaw system characteristics, are included in the defining of the control parameters in such a way that the amplitude of the change in the rotational position of the nacelle is minimized in such a way that the amplitude of the blade vibration mode is reduced. The disclosure is based on the recognition that vibration modes of the rotor blades in the rotor plane are reflected in the yaw drives and in particular in the rotational speed of the yaw drives and thus can be dampened by control of the yaw drives. The yaw drives are controlled, for example, by a negative feedback loop or by using a notch filter that corresponds to the frequency of the vibration mode of the rotor blades in order to actively dampen the effect of the impinging torque caused by relevant excitations in the frequency range around the predetermined frequency (f). In contrast to known methods, active damping of the amplitude of a change in the rotational position of the nacelle and consequently a reduction of vibrations modes occur in this case. The method according to the disclosure does not significantly restrict the power output of the wind turbine and utilizes already existing yaw drives and controls of the wind turbine for damping.

The disclosure takes the fact into account that the yaw drives may not directly experience the vibration of the rotor blades; instead, torsional moment is also exerted on the tower of the wind turbine from the vibration of the rotor blades. Since the tower of the wind turbine is also a system that can vibrate, it shows a frequency response in the form of torsional vibration excited by the frequencies of forces and torques acting on the tower. With the disclosure, it was established that active damping leads to a reduction of the rotor blade vibrations at the whirling mode frequency. This can be achieved when the predetermined frequency (f) is determined dependent on the rotational speed of the rotor in an operational state of the wind turbine, for example, full load operation or partial load operation. Over certain ranges of the rotational speed of the rotor, there the natural frequency (eigenfrequency) of the vibration mode depends on the rotational speed. For active damping of the amplitude of a change in the rotational position of the nacelle, it is however sufficient to determine a frequency to be dampened by the negative feedback loop independent of the rotational speed of the rotor in this case.

In an embodiment, the at least one yaw drive is controlled such that an amplitude of a change in the rotational position of the nacelle at a predetermined frequency is dampened. The change in the rotational position of the nacelle is used as value indicative of the vibration mode of the rotor blades. Due to the vibration mode of the rotor blades a torque is acting on the yaw system which changes the rotational position of the nacelle. The rotational position is controlled such that an amplitude of a change in the rotational position of the nacelle at a predetermined frequency (f) is dampened, wherein the predetermined frequency (f) corresponds to the vibration mode of the rotor blades in the rotor plane. The predetermined frequency (f) corresponds to a resonant vibration mode of the rotor blades in the rotor plane. Preferable the predetermined frequency (f) depends on the rotor frequency (1P) and has in particular a constant shift in relation to the rotor frequency (1P).

A yaw system which is particular suited for the method according to the disclosure is configured in such a way that the nacelle rotational position is held dynamically by yaw drives controlled by a yaw control system featuring a cascaded structure, for example, for rotational position control, rotational speed control, and current control of the yaw drives. Preferably, holding the nacelle at a specific rotational position is achieved by a tension between at least two yaw drives. The yaw drives each apply a torque in such a manner that the rotational position of the nacelle is maintained. In order to rotate the nacelle to a specific rotational position the yaw drives have to rotate in the same direction while the tension between the yaw drives is maintained with a speed offset.

Preferably such a yaw system includes a low friction bearing. Accordingly, it is preferred that no yaw brakes are applied. Thus the nacelle can be positioned allowing high frequency operation for both operating states, holding the nacelle in a specific rotational position and moving the nacelle to a specific rotational position.

In a preferred cascaded control scheme of the yaw control system, a first-level rotational position control specifies a target value for a second-level rotational speed control of the at least one yaw drive. The second-level rotational speed control may include a PI (Proportional and Integral) controller. In an embodiment the second-level rotational speed control includes a notch filter which dampens the vibration modes of the rotor blades at the predetermined frequency (f). The notch filter can work with an output signal of the PI controller. The target value of the second-level rotational speed control is converted into a target value for a torque to be provided to the yaw drive. The target value for the torque can be fed into a third-level current control.

In an embodiment of the method according to the disclosure, the torque is corrected by the negative feedback loop depending on the measured actual value of the rotational speed. The corresponding correction value of the torque is subtracted from the target value of the torque. In active damping, the predetermined frequency (f) is established by correlation of the vibration mode of the rotor blades to the actual value of the rotational speed of the yaw drives. By reducing the absolute movement of the nacelle, that is, a change in the rotational position of the nacelle, at the predetermined frequency (f), the amplitudes of the rotor blade vibration modes are suppressed.

In an embodiment, the negative feedback loop includes a bandpass filter having a range of passing frequencies which encompasses the predetermined frequency (f). Also an amplification of the correction value for the torque in order to achieve the desired active damping can be provided in the negative feedback loop.

The predetermined frequency (f) is preferably a whirling mode frequency of the rotor blades plus/minus the rotational frequency of the rotor (1P), in particular the first edgewise whirling mode frequency of a vibration running against the rotational direction of the rotor (first edgewise backward whirling mode) minus the rotational frequency of the rotor (1P).

The objective according to the disclosure is also achieved by a wind turbine. The wind turbine according to the disclosure has a tower, a nacelle and a rotor with at least two rotor blades and a yaw system that can rotate the nacelle about a vertical axis of the tower. A yaw control for the at least one yaw drive receives at least one signal indicative of the wind direction and controls the position of the nacelle according to the received signal. This allows to align the nacelle with the wind direction. The yaw control for the at least one yaw drive further depends on at least one value indicative of a vibration mode of the rotor blades. As explained above the wind turbine allows to dampen and avoid rotational modes of the rotor blades. The wind turbine according to the disclosure uses active damping since the coupled degree of freedom of the nacelle rotation is controlled in order to suppress the vibration mode of the rotor blades. The wind turbine according to the disclosure is based on the knowledge that vibrations of the rotor blades in the rotor plane can be actively suppressed by controlling the yaw drives. In this case, it is possible to do without a significant loss of the power output.

Preferably, the yaw control receives a signal 132 corresponding to a change in the rotational position of the nacelle as the at least one value indicative of the vibration mode of the rotor blades. The change in the rotational position of the nacelle is a signal over the time which can be transformed into a rotational position signal having an amplitude and a frequency. The yaw control is configured to control the rotational position of the nacelle such that an amplitude of a change in the rotational position of the nacelle at a predetermined frequency (f) is dampened, wherein the predetermined frequency (f) corresponds to the vibration mode of the rotor blades in the rotor plane.

In an embodiment the yaw system includes a first-level rotational position control and a second-level rotational speed control for the at least one yaw drive. The second-level rotational speed control converts a target value for the rotational speed into a target value for a torque. The second-level rotational speed control may include a PI controller. Preferable the second-level rotational speed control includes a notch filter which supports the control in dampening blade vibrations at the predetermined frequency (f).

In an embodiment a negative feedback loop is configured to dampen blade vibrations at the predetermined frequency (f). In the actual values of the rotational speed for the at least one yaw drive, the predetermined frequency (f) is corresponding to the vibration modes of the rotor blades in the rotor plane.

In an embodiment, the first-level rotational position control specifies a target value for the rotational speed of the yaw drive. The target value for the rotational speed is converted by a second-level rotational speed control into a target value for a torque of the yaw drive. The second-level rotational speed control includes for example a PI controller. The second-level rotational speed control may also include a notch filter which supports the control in dampening the vibration modes of the rotor blades at the predetermined frequency (f).

In an embodiment, alternatively to the notch filter or in addition to the notch filter a negative feedback loop can be provided, which generates preferably a correction value for the torque of the yaw drive depending on the actual value of the rotational speed of the yaw drive. The correction value for the torque of the yaw drive is subtracted from the target value for the torque of the yaw drive.

Preferably a bandpass filter is used to determine the correction value for the torque, the passing range of the bandpass filter containing the predetermined frequency (f) for the vibrations of the rotor blades in the rotor plane. Moreover, the correction value for the torque is determined in the negative feedback loop by an amplification element K. The controller can be configured as a PI controller.

BRIEF DESCRIPTION OF DRAWINGS

The invention will now be described with reference to the drawings wherein.

DETAILED DESCRIPTION

Figure 1:
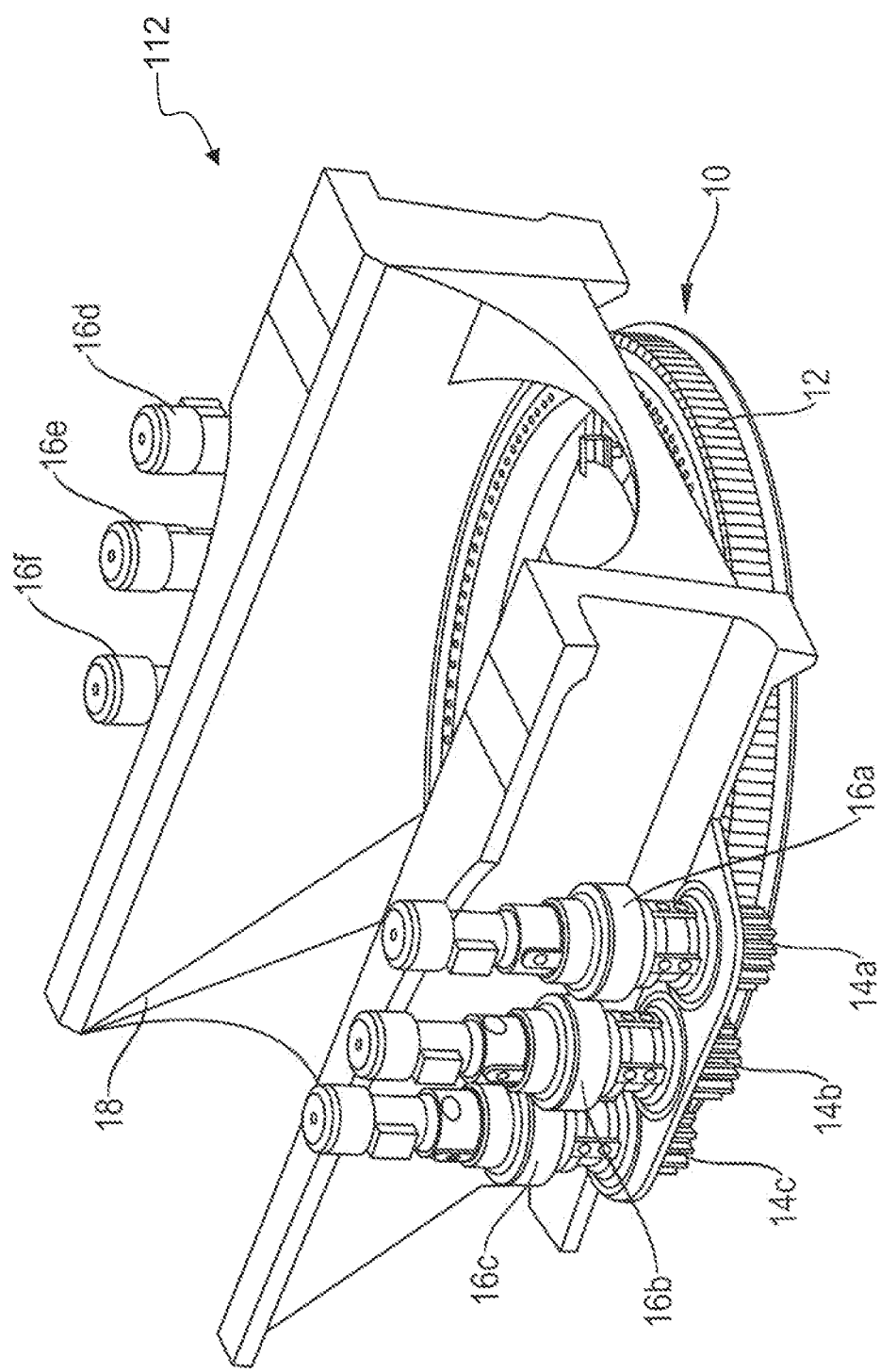
FIG. 1 shows a schematic of a yaw system having several yaw drives for a wind turbine.

FIG. 1 shows a yaw system for a wind turbine. The rotary connection 10, typically located between the tower and the nacelle is shown, wherein it has external teeth 12 in which the particular drive pinions 14a-c of the individual yaw drives 16a-f mesh. In FIG. 1, a machine frame 18 can furthermore be seen which is supporting the nacelle (not shown) including the drive train (not shown) and other components (not shown).

The several yaw drives 16a-f which work independent of each other effectuate a rotation of the nacelle about the vertical axis of the tower and adjust the alignment of the nacelle in a horizontal direction. The yaw drive assembly 112 shown in FIG. 1 is represented schematically in FIG. 2 by block 112. The yaw control shown in FIG. 2 receives a signal 132 corresponding to a change in the rotational position of the nacelle as the at least one value indicative of the vibration mode of the rotor blades.

Figure 2:
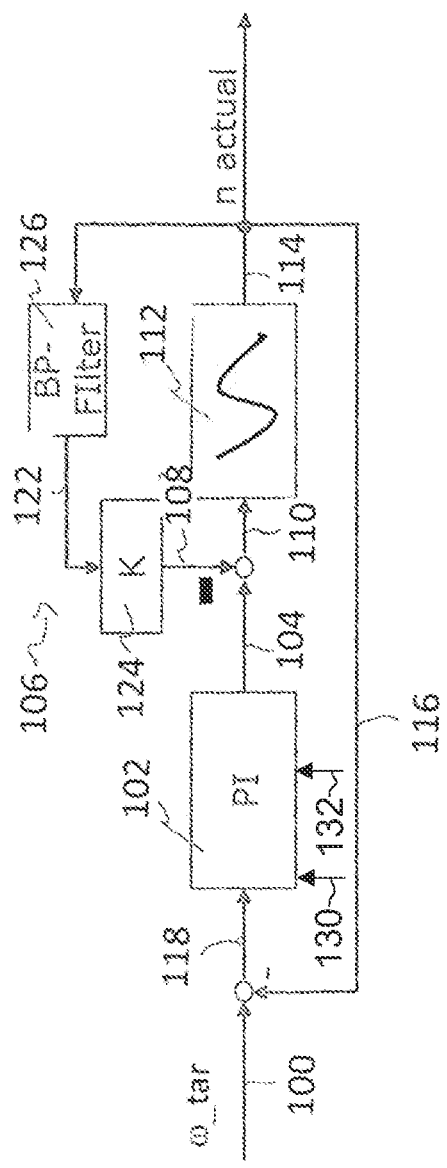
FIG. 2 shows a schematic of the yaw control incorporating a PI controller for active damping.

FIG. 2 shows a schematic view of the rotational speed control. A target value for the rotational speed $\omega_{tar}$ is applied to a rotational speed controller. This is adjusted by a PI controller to a target value for a torque applied to the yaw drive. The rotational speed control can assume various tasks through the yaw system. On the one hand, the yaw drives of the yaw system can be rotated into a specific horizontal direction, for example when the wind direction changes and the rotor of the wind turbine is to be aligned corresponding to the wind direction. A yaw control for the at least one yaw drive receives at least one signal 130 indicative of the wind direction and controls the position of the nacelle according to the received signal. An adjustment of the rotational speed of the yaw drive also occurs when the rotor of the wind turbine is fixed in a specific horizontal direction (hold state). In this case, different yaw drives can be controlled in opposite rotational directions in order to apply tension between the yaw drives and thereby maintain the alignment of the rotor of the wind turbine in a specific horizontal direction. In the hold state, several external forces may act on the wind turbine which can cause a rotational motion of the nacelle. To this extent, the cascaded control of the yaw drives always actively works with changing rotational speed values even when it attempts to maintain a specific alignment of the rotor of the wind turbine. The applied target value for the rotational speed 100 is converted by a PI controller 102 into a target value for the torque M'$_{tar}$ 104 to be generated. A correction value for the torque M$_{corr}$ 108 originates from a negative feedback loop 106. Both values are subtracted from each other and sent to the yaw drive assembly 112 as a corrected target value for the torque 110. By controlling the yaw drive assembly 112 with the corrected target value for the torque 110 together with the external effects consisting of forces and torques that arise during the operation of the wind turbine an actual value of the rotational speed n$_{actual}$ 114 is produced. This actual value of the rotational speed n$_{actual}$ 114 is subtracted through closed feedback loop 116 from the target value for the rotational speed 100 in order to form the control variable 118 for the PI controller 102. Likewise, the actual value of the rotational speed n$_{actual}$ 114 is applied to a bandpass filter 126. The bandpass filter 126 includes a passing range for frequencies around the predetermined frequency (f) at which vibration modes of the rotor blades have to be dampened. Consequently, those frequencies are suppressed by the bandpass filter 126 that do not correspond to the passing range for frequencies around the predetermined frequency (f) and consequently those frequencies are allowed to pass which correspond to the frequency of the resonant blade vibrations to be dampened. The bandpass-filtered rotational speed 122 is recalculated by an amplification element K 124 into the correction value for the torque M$_{corr}$ 108. A resonant vibration mode of the rotor blade is thereby dampened.

Figure 3:
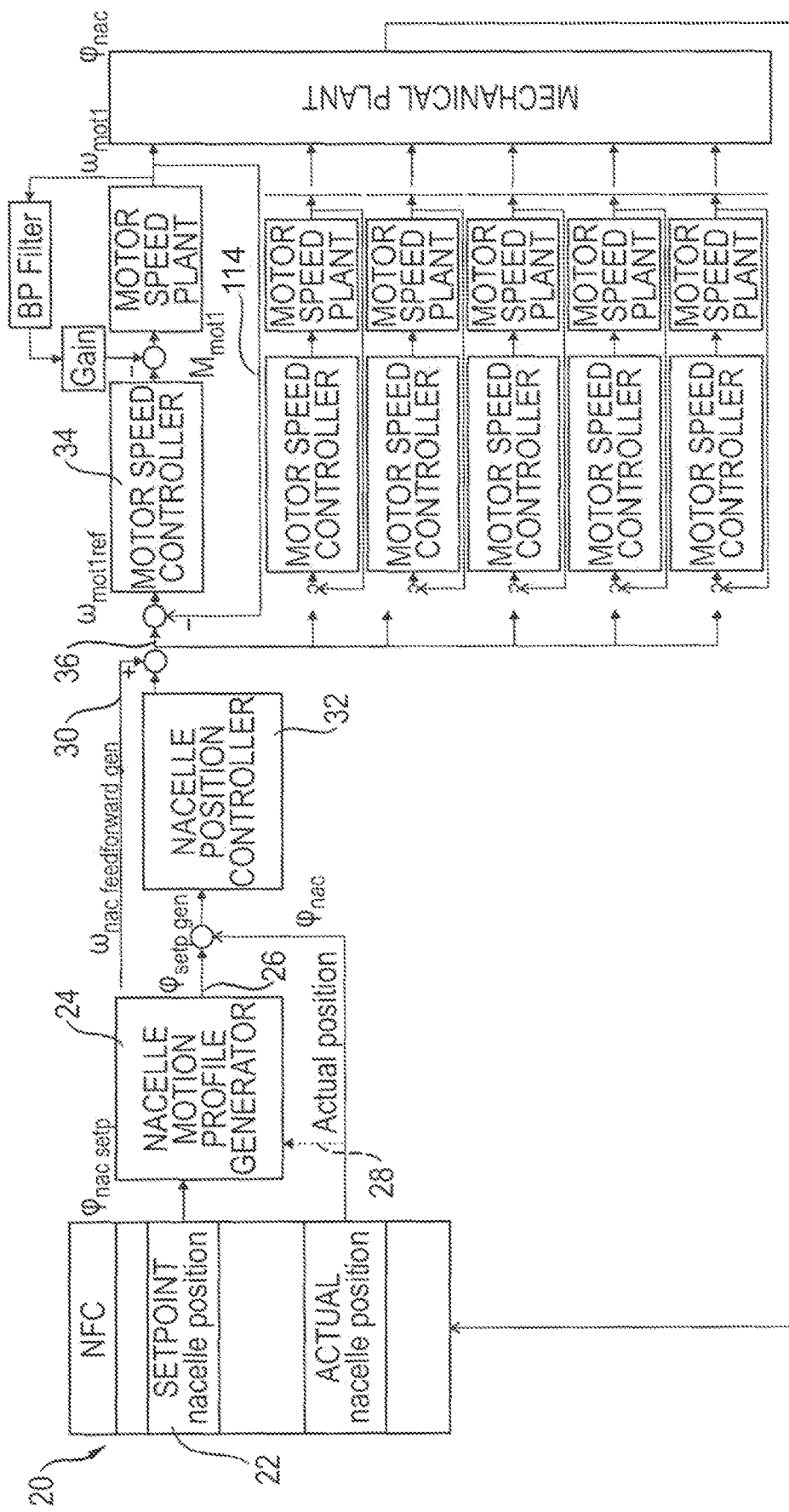
FIG. 3 shows a schematic of incorporating the controller for active damping in the yaw control; and, FIG. 4 shows a schematic of incorporating the controller for active damping in the yaw control by using a notch filter.

FIG. 3 shows a schematic overall view of the position control of the yaw drive, wherein the position of the yaw drive is expressed by a yaw angle. A first-level rotational position control 20 specifies a target value for the yaw angle 22 that is converted by a profile generator 24 into a generated target value for the yaw angle 26. The actual value of the yaw angle 28 is also applied to the profile generator 24 so that the generated target value for the yaw angle 26 can be determined not only depending on the target value for the yaw angle 22, but also depending on the actual value of the yaw angle 28.

The profile generator 24 simultaneously also produces a generated angular velocity 30 by a forward control loop. A position controller 32 converts the difference between the generated target value for the yaw angle 26 and the actual value of the yaw angle 28 into a rotational speed that is distributed together with the generated angular velocity 30 from the forward control loop to the individual yaw drives. The generated target value from the forward control loop together with the target value from the position controller 32 form the overall target value for the rotational speed 36. The yaw drive assembly 112 is operated by a rotational speed controller 34 to which the difference between the actual value of the rotational speed 114 and the overall target value of the rotational speed 36 is applied as a control difference. The corresponding yaw drive is controlled by the controller structure from FIG. 2 and so defines the yaw control. The actual value of the yaw angle 28 is detected at the rotary connection 10 and reported back to the first-level rotational position control 20.

Figure 4:
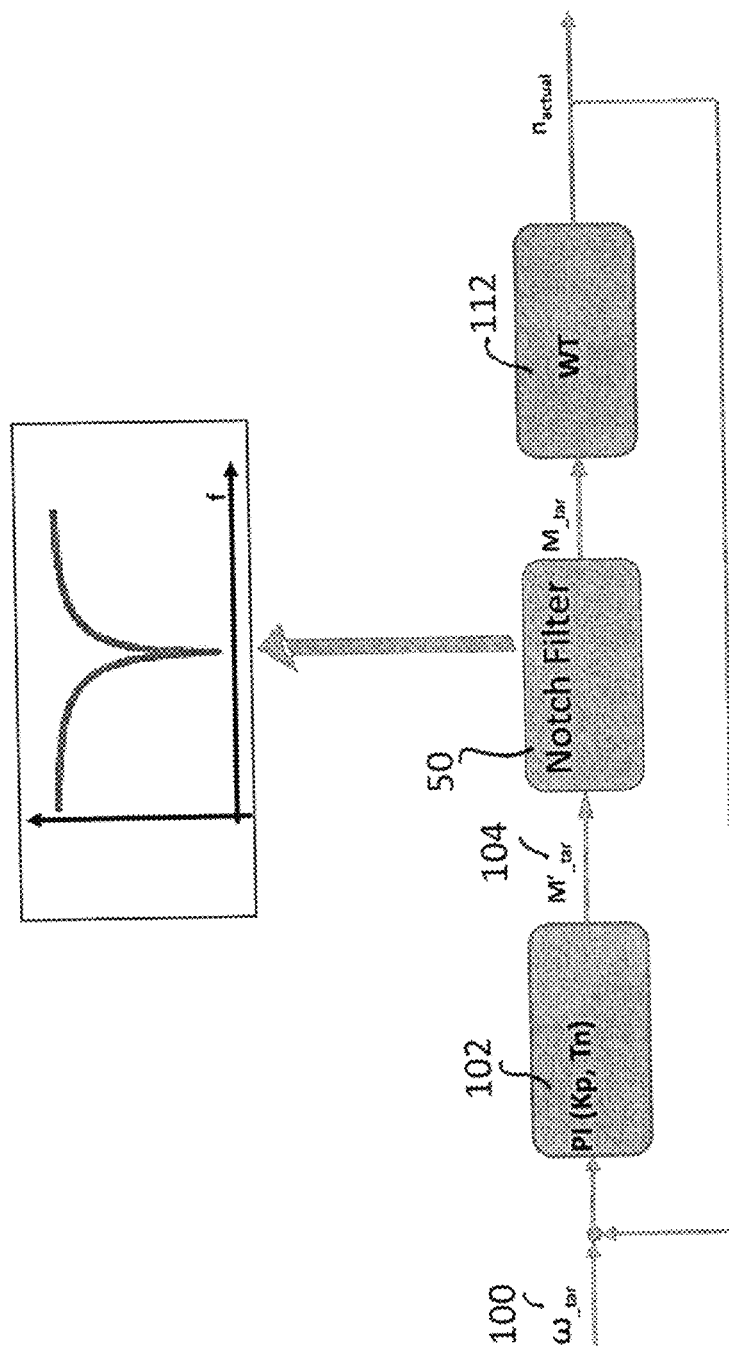

FIG. 4 shows a schematic overview using a notch filter 50 for the target value for the rotational speed $\omega_{tar}$ 100. Just as in the embodiment with a negative feedback loop shown in FIG. 2, the target value for the rotational speed $\omega_{tar}$ 100 is applied to the PI controller 102 and converted into a target value for the torque M'$_{tar}$ 104. The target value for the torque M'$_{tar}$ 104 is applied to the notch filter 50 which calculates a final target value for the torque M$_{tar}$. This final target value for the torque M$_{tar}$ is applied to the current controller of the yaw drive assembly 112. The way of using the notch filter 50 in a forward line avoids an additional control loop which could bring control interferences and control instability. The notch filter 50 is used for filtering the target value for the torque M'$_{tar}$ 104 having filter settings which provide a specific frequency rejection range, the specific frequency rejection range including the predetermined frequency (f). In an embodiment the yaw system includes a first-level rotational position control and a second-level rotational speed control for the at least one yaw drive. The second-level rotational speed control converts a target value for the rotational speed into a target value for a torque. The second-level rotational speed control may include a PI controller. Preferable the second-level rotational speed control includes the notch filter 50 shown in FIG. 4 which supports the control in dampening blade vibrations at the predetermined frequency (f).

It is understood that the foregoing description is that of the preferred embodiments of the invention and that various changes and modifications may be made thereto without departing from the spirit and scope of the invention as defined in the appended claims.

REFERENCES (PART OF THE DESCRIPTION)

10 rotary connection
12 external teeth
14a-c drive pinions
16a-f yaw drives
20 first-level rotational position control
22 target value for the yaw angle
24 profile generator
26 a generated target value for the yaw angle
28 actual value of the yaw angle
30 generated angular velocity
32 position controller
34 rotational speed controller
36 overall target value for the rotational speed
50 notch filter
100 target value for the rotational speed
102 PI controller
104 target value for the torque
106 negative feedback loop
108 correction value for the torque
110 corrected target value for the torque
112 yaw drive assembly
114 actual value of the rotational speed
116 closed feedback loop
118 control variable
126 bandpass filter
122 bandpass-filtered rotational speed
124 amplification element
130 signal indicating wind direction
132 signal indicating change in rotational position of nacelle
$\omega_{tar}$ target value for the rotational speed
M'$_{tar}$ target value for the torque
M$_{tar}$ final target value for the torque
M$_{corr}$ correction value for the torque
K amplification element
BP-Filter bandpass filter
n$_{actual}$ actual value of the rotational speed

The invention claimed is:

1. A method for controlling a wind turbine including a tower defining a vertical axis, a nacelle, a rotor having at least two rotor blades defining a rotor plane, and also a yaw system having at least one yaw drive for rotating the nacelle about the vertical axis, the method comprising the steps of:
   providing at least one signal indicative of wind direction;
   providing at least one value indicative of an edgewise vibration mode of the at least two rotor blades in the rotor plane; and,
   applying the at least one signal to a yaw control for the at least one yaw drive to control the position of the nacelle according to the at least one signal and wherein the yaw control further depends upon the at least one value indicative of the edgewise vibration mode of the at least two rotor blades in the rotor plane;
   wherein:
   a change in a rotational position of the nacelle is the at least one value indicative of the edgewise vibration mode of the at least two rotor blades;
   a rotational speed of the at least one yaw drive is controlled such that an amplitude of the change in the rotational position of the nacelle at a predetermined frequency (f) is dampened; and,
   the predetermined frequency (f) corresponds to the edgewise vibration mode of the at least two rotor blades in the rotor plane.

2. The method of claim 1, wherein the predetermined frequency (f) is determined in dependence upon a rotor frequency in an operational state of the wind turbine.

3. The method of claim 1, wherein the predetermined frequency (f) is determined by a whirling mode frequency of the at least two rotor blades in the rotor plane; and, the whirling mode frequency is determined by a first edgewise backward whirling mode frequency.

4. A wind turbine comprising:
   a tower defining a vertical axis;
   a nacelle mounted on said tower;
   a rotor having at least two rotor blades defining a rotor plane;
   a yaw system including at least one yaw drive for rotating said nacelle about said vertical axis;
   a yaw control for said at least one yaw drive;

said yaw control being configured to receive at least one signal indicative of wind direction and to control a position of said nacelle in accordance with said at least one signal; and, said yaw control being further dependent on at least one value indicative of an edgewise vibration mode of said at least two rotor blades in said rotor plane;

wherein:

said yaw control receives a change in the rotational position of the nacelle as said at least one value indicative of the edgewise vibration mode of the at least two rotor blades;

said yaw control is configured to control the rotational position of said nacelle such that an amplitude of the change in the rotational position of said nacelle at a predetermined frequency (f) is dampened; and, the predetermined frequency (f) corresponds to the edgewise vibration mode of said at least two rotor blades in said rotor plane.

5. The wind turbine of claim 4, wherein:

said yaw control comprises a first-level rotational position control for said at least one yaw drive; and, said first-level rotational position control specifies a target value for a rotational speed that is converted by a second-level rotational speed control for said at least one yaw drive into a target value for a torque.

6. The wind turbine of claim 5, wherein said second-level rotational speed control comprises a PI (Proportional and Integral) controller.

7. The wind turbine of claim 6, wherein said second-level rotational speed control comprises a notch filter which dampens the amplitude of the change in the rotational position of the nacelle at the predetermined frequency (f).

8. The wind turbine of claim 7, wherein a negative feedback loop is provided, which generates a correction value ($M_{corr}$) for the torque in dependence upon an actual value of a rotational speed ($n_{actual}$) that is subtracted from the target value for the torque.

9. The wind turbine of claim 8, wherein said correction value ($M_{corr}$) for the torque is determined by a bandpass filter having a passing range containing said predetermined frequency (f).

10. The wind turbine of claim 8, wherein said negative feedback loop has an amplification (K) of said correction value ($M_{corr}$) for the torque.

* * * * *